US012179850B2

(12) United States Patent
Minninger

(10) Patent No.: US 12,179,850 B2
(45) Date of Patent: Dec. 31, 2024

(54) STEER-BY-WIRE STEERING SYSTEM FOR A TWO-TRACK VEHICLE

(71) Applicant: AUDI AG, Ingolstadt (DE)

(72) Inventor: Arne Minninger, Ingolstadt (DE)

(73) Assignee: AUDI AG, Ingolstadt (DE)

(*) Notice: Subject to any disclaimer, the term of this patent is extended or adjusted under 35 U.S.C. 154(b) by 730 days.

(21) Appl. No.: 17/485,844

(22) Filed: Sep. 27, 2021

(65) Prior Publication Data

US 2022/0119033 A1 Apr. 21, 2022

(30) Foreign Application Priority Data

Oct. 21, 2020 (DE) .................... 10 2020 127 661.3

(51) Int. Cl.
*B62D 5/00* (2006.01)
*B62D 5/04* (2006.01)
*B62D 6/00* (2006.01)

(52) U.S. Cl.
CPC .......... *B62D 5/006* (2013.01); *B62D 5/0484* (2013.01); *B62D 6/00* (2013.01)

(58) Field of Classification Search
CPC ......... B62D 5/006; B62D 5/0484; B62D 6/00
See application file for complete search history.

(56) References Cited

U.S. PATENT DOCUMENTS 6,176,341 B1 * 1/2001 Ansari .................. B62D 6/008 180/402
6,691,009 B1 * 2/2004 Yao ....................... B62D 6/008 701/41
8,405,522 B2 3/2013 Shaffer et al.
9,227,635 B1 * 1/2016 Takamatsu ........... B62D 15/025

(Continued)

FOREIGN PATENT DOCUMENTS

CN 105313899 A 2/2016
DE 199 12 169 A1 7/2000

(Continued)

OTHER PUBLICATIONS

Office Action issued on Nov. 24, 2023, in corresponding Chinese Application No. 202111216024.7, 16 pages.

(Continued)

*Primary Examiner* — Jacob D Knutson
(74) *Attorney, Agent, or Firm* — Maier & Maier, PLLC

(57) ABSTRACT

A steer-by-wire steering system for a vehicle, having a steering handle, a steering gear actuator mechanically decoupled from the steering handle, a steering sensor which detects a rotational position and/or a rotational movement of the steering handle as a steering command, an electronic control unit which, as a function of the detected steering command, activates the steering gear actuator to set a vehicle wheel steering angle (α), and a hand actuator activatable by the control unit, which generates different types of haptic feedback (R1, R2, R3) for the driver on the steering handle, namely a haptic steering feedback (R1) in which a steering counter torque is applied to the steering handle, a roadway feedback (R2), which correlates with a roadway-side disturbance excitation acting on the vehicle, and a warning feedback (R3), which informs the driver of a fault in the steer-by-wire steering system.

20 Claims, 3 Drawing Sheets

(56) References Cited

U.S. PATENT DOCUMENTS

| | | | | |
|---|---|---|---|---|
| 2002/0129988 | A1 * | 9/2002 | Stout | B62D 6/008 180/422 |
| 2006/0119474 | A1 | 6/2006 | Requejo | |
| 2018/0257560 | A1 | 9/2018 | Kapuria et al. | |

FOREIGN PATENT DOCUMENTS

| | | | | |
|---|---|---|---|---|
| DE | 10 2004 000 060 | A1 | 6/2006 | |
| DE | 102010042896 | B4 * | 7/2014 | B62D 6/008 |
| DE | 10 2014 211815 | A1 | 12/2015 | |
| DE | 102017122168 | A1 * | 3/2018 | B62D 5/0457 |
| DE | 10 2017 203748 | A1 | 9/2018 | |
| DE | 102018204582 | A1 * | 9/2019 | |
| EP | 2 393 701 | B1 | 11/2013 | |
| JP | H08324448 | A | 12/1996 | |
| JP | H11261991 | A | 9/1999 | |
| WO | 2019224156 | A1 | 11/2019 | |

OTHER PUBLICATIONS

European Search Report dated Feb. 3, 2022, in corresponding to European Application No. 21194584.5; 5 pages.

Examination Report issued on Mar. 5, 2021 in corresponding German application No. 10 2020 127 661.3; 10 pages Including Machine-generated English-language translation.

* cited by examiner

Fig. 2

STEER-BY-WIRE STEERING SYSTEM FOR A TWO-TRACK VEHICLE

FIELD

The invention relates to a steer-by-wire steering system for a two-track vehicle and a method for operating a steer-by-wire steering system.

BACKGROUND

A generic steer-by-wire steering system, similarly to a conventional, electromechanical steering system, has a steering wheel and a steering gear. In contrast to the conventional steering system, however, no steering column is provided in the steer-by-wire steering system, so that there is no mechanical connection between the steering wheel and the steering gear. The steering wheel and the steering gear are thus mechanically decoupled from one another and are controlled completely electronically via a force and travel activation. For the electronic activation, the steering system has a steering sensor and a control unit as well as a steering gear actuator for activating the steering gear. The steering sensor detects the steering request given by the driver on the basis of a rotary position and/or a rotary actuation of the steering wheel and generates a steering command therefrom. As a function of this steering command, the control unit activates the steering gear actuator which, by means of the steering gear, sets a vehicle wheel steering angle corresponding to the steering request.

To provide the driver with haptic feedback, an electromechanical hand actuator is also provided, which acts as a force feedback actuator and generates the different types of haptic feedback on the steering wheel. The different types of haptic feedback are a steering feedback in which the steering wheel is subjected to a steering counter-torque depending on the steering forces that occur, and a roadway feedback that correlates with a roadway-side disturbance excitation acting on the vehicle.

Due to the lack of a mechanical connection between the steering wheel and the steering gear, measures have to be provided which ensure a steering capability even in the event of a steering system fault in the steer-by-wire steering system. Nevertheless, the driver is to be made aware of malfunctions in the steering system or other components at an early stage. For this purpose, in addition to the steering and roadway feedback, a haptic warning feedback (for example rotational steering wheel vibration) is provided, which is also generated by the hand actuator on the steering wheel and which notifies the driver of the presence of a steering system fault. The disadvantage of this, however, is that the different types of haptic feedback generated on the steering wheel are superimposed and it is therefore not ensured that the driver will reliably perceive the warning feedback in all driving states.

A lane keeping assistant having haptic warning is known from U.S. Pat. No. 8,405,522 B2, in which vibrations caused by the roadway are compensated for.

SUMMARY

The object of the invention is to provide a steer-by-wire steering system for a two-track vehicle and a method for operating a steer-by-wire steering system having increased perceptibility of the warning feedback for the driver.

According to the disclosure, an evaluation unit is associated with the control unit, by means of which the haptic roadway feedback can at least be weakened or deactivated in the event of a steering system fault, in comparison to normal steering system operation without a steering system fault. As a result, the driver can perceive the warning feedback more easily, since it is not falsified by the roadway feedback or negatively influenced by it. This has the advantage that faults in the steering system are reliably perceived by the driver and accidents can thus be avoided.

In one specific embodiment, the control unit can be assigned a steering converter module which, in particular during a steering process, generates a steering counter torque signal, using which the hand actuator is activatable to generate the steering feedback on the steering handle. The driver thus receives feedback about occurring steering forces, such as restoring forces, even without a drive connection between the steering handle and the steering gear. As in the case of electromechanical steering systems, the driver can therefore use the steering feedback to infer the current driving status of the vehicle and, for example, recognize under-steering. In this way, driving safety is advantageously also ensured with the steer-by-wire steering system.

A roadway converter module can preferably be associated with the control unit, which generates a roadway signal based on the roadway-side disturbance excitation, using which the hand actuator is activatable to generate the roadway feedback on the steering handle. The driver can draw conclusions about the roadway properties based on the roadway feedback and, for example, recognize whether the vehicle is currently driving on a grippy or rather slippery roadway. This has the advantage that the driver can adapt his driving style to the roadway properties, so that driving safety is further increased.

Particularly preferably, a diagnostic module can be associated with the control unit, which generates a warning signal in the event of a steering system fault, using which the hand actuator is activatable to generate the warning feedback on the steering handle. Because the warning signal is generated directly on the steering handle and the driver is always in contact with the steering handle while driving, he is aware of the steering system fault without being distracted. The driving safety is thus increased even further. Alternatively or additionally, an output unit can also be activatable using the hand actuator, in particular, in addition to the warning feedback, to generate an acoustic and/or visual warning message on the output unit. In the event of a steering system fault, the driver is thus warned via multiple channels (haptic, visual, acoustic), which increases the reliability with which the driver perceives the warning feedback.

In one preferred embodiment, at least one steering system parameter, in particular a steering system operating voltage level, is detectable and comparable to a predefined steering system target parameter, in particular a steering system target operating voltage level, by means of the diagnostic module for recognizing a steering system fault, wherein the warning signal can be generated by means of the diagnostic module in particular when the steering system target parameter is exceeded or not reached. In a steer-by-wire steering system, the voltage supply represents a critical steering system parameter, since if the operating voltage is excessively low, the steer-by-wire steering system no longer functions and the vehicle is therefore no longer steerable. Monitoring the voltage supply therefore has the advantage that accidents can be avoided which would otherwise be due to a lack of steerability.

In one particularly preferred embodiment, the different types of haptic feedback that can be provided on the steering handle can partially be superimposed on one another.

The haptic warning feedback can preferably be a steering handle vibration. This has the advantage that the driver is subliminally but reliably made aware of the warning feedback without the risk of the driver being distracted or even startled in critical driving situations due to the warning feedback.

Particularly preferably, a signal processing unit activatable by the evaluation unit can be interconnected in the signal path from the roadway converter module to the hand actuator, wherein the signal processing unit is activatable by means of the evaluation unit in the event of a steering system fault, so that a signal transmission of the roadway signal to the hand actuator is blocked or a modified roadway signal can be generated in the signal processing unit, by means of which a weakened roadway feedback is applicable to the steering handle. The roadway feedback is thus weakened in its intensity or switched off completely. As a result, the warning feedback is no longer disturbed by or superimposed with the roadway feedback. This has the advantage that it is unmistakably recognizable to the driver whether there is a warning feedback that requires his intervention.

In one specific embodiment, the weakened roadway feedback can have a reduced amplitude level and/or a reduced frequency in comparison to the roadway feedback in normal steering system operation.

The term warning feedback is to be understood broadly, so that a warning feedback can also be output even if there is no fault in the steering system and instead the driver is to be informed, for example, about a special operating or driving state of the vehicle by means of the warning feedback.

BRIEF DESCRIPTION OF THE FIGURES

An exemplary embodiment of the invention is described below on the basis of the figures.

In the figures:

FIG. 2 shows a schematic block diagram of the mode of operation of the steer-by-wire steering system of FIG. 1.

DETAILED DESCRIPTION

Figure 1:
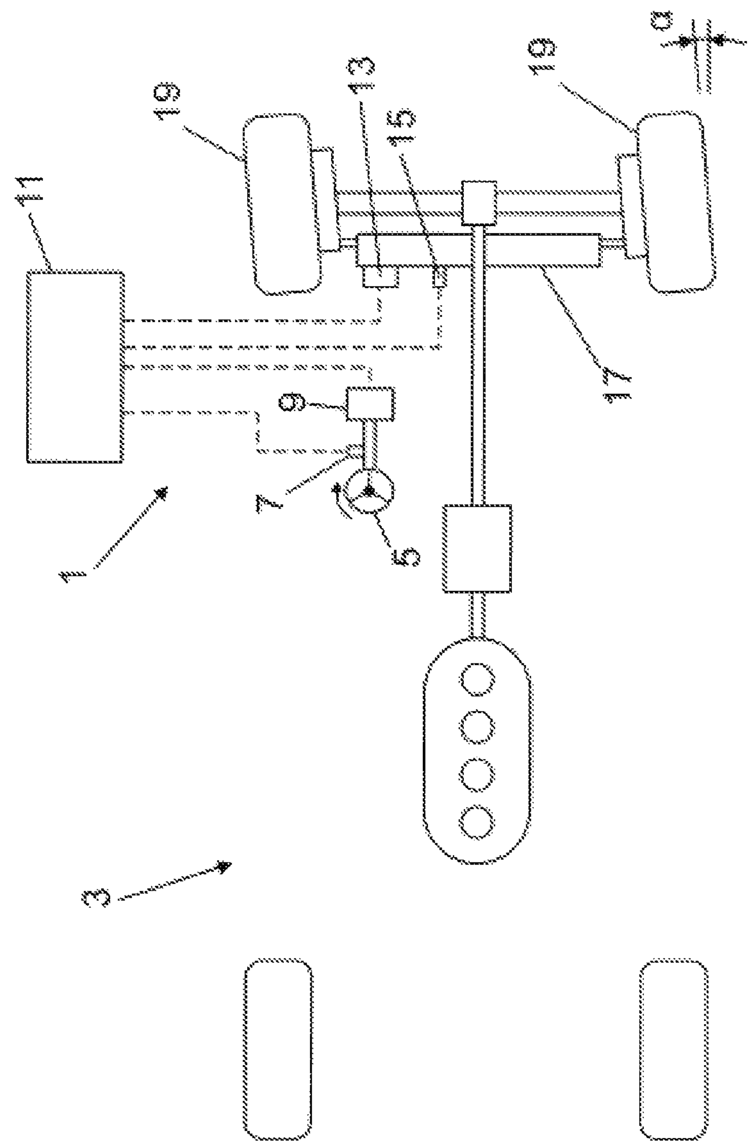
FIG. 1 shows a schematic diagram of a steer-by-wire steering system in a two-track vehicle.

FIG. 1 shows the structure of a steer-by-wire steering system 1 provided in a two-track vehicle 3. The steer-by-wire steering system 1 has a steering wheel 5 as a steering handle, with which a steering sensor 7 and a hand actuator 9 are associated. The steering sensor 7 and the hand actuator 9 are in signal connection with a steering gear actuator 13 and a steering gear sensor system 15, which are associated with a steering gear 17, which has a drive connection to the front wheels 19 of the vehicle 3, with a control unit 11 interconnected.

To carry out a steering process, the steering sensor 7 detects a rotational position or a rotational movement of the steering wheel 5 and uses this to generate a steering command which is transmitted to the control unit 11. The control unit 11 controls the steering gear actuator 13 as a function of the steering command, whereupon a vehicle wheel steering angle $\alpha$ is set on the front wheels 19 by means of the steering gear 17.

To give the driver feedback about acting steering forces, roadway-side disturbance excitations, or the state of the steer-by-wire steering system 1, the control unit 11 activates the hand actuator 9, which acts as a force feedback unit, which thereupon generates corresponding haptic feedback on the steering wheel 5. The activation of the hand actuator 9 by the control unit 11 and its structure is described below with reference to FIGS. 2 and 3, wherein FIG. 3 is discussed first, which shows the control unit 11 according to the prior art.

Figure 3:
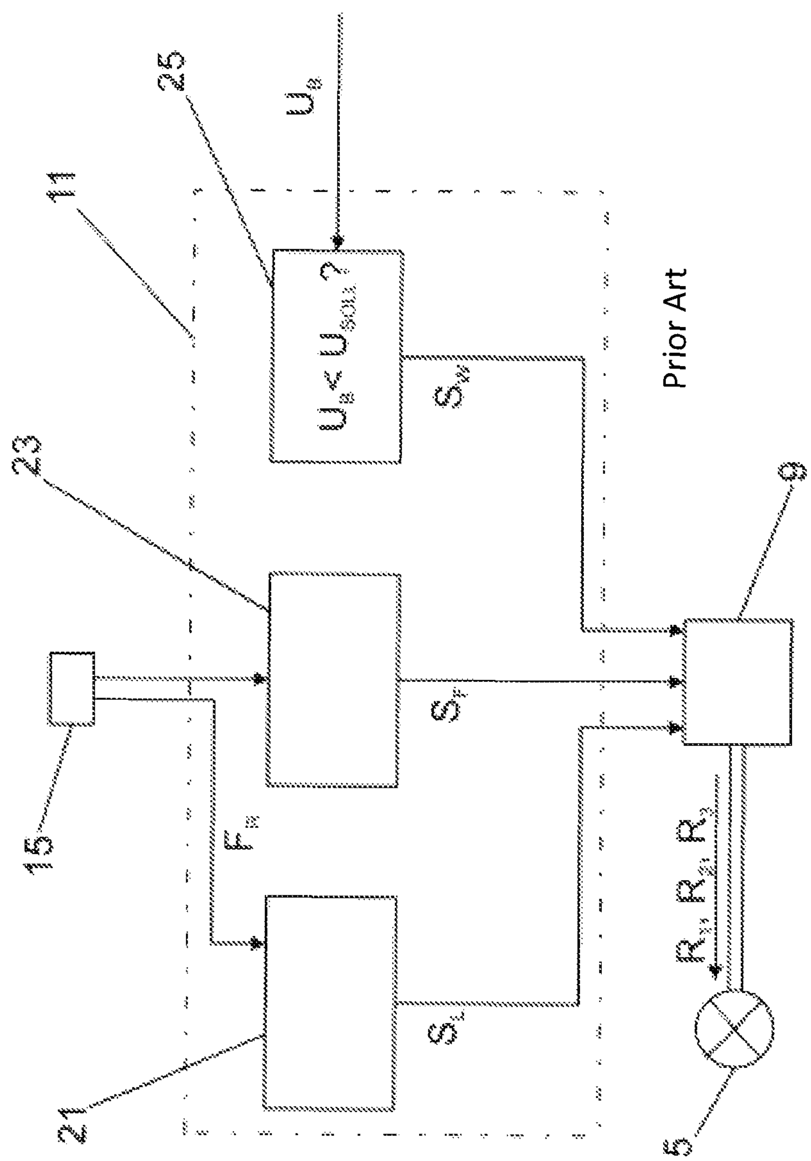
FIG. 3 shows a schematic block diagram of the mode of operation of a steer-by-wire steering system according to the prior art.

A steering converter module 21, a roadway converter module 23, and a diagnostic module 25 are associated with the control unit 11 of FIG. 3, each of which is in signal connection with the hand actuator 9.

By means of the steering gear sensor system 15, a restoring force $F_R$ acting on the front wheels 19 is sensed as an example of a steering parameter and transmitted to the steering converter module 21. The steering converter module 21 generates a steering counter torque signal $S_L$ as a function of the restoring force, using which the hand actuator 9 is activated to apply a steering feedback R1 in the form of a steering counter torque to the steering wheel 5.

Roadway-side disturbance excitations acting on the front wheels 19 are detected by the steering gear sensor system 15 and transmitted to the roadway converter module 23. The roadway converter module 23 generates a roadway signal $S_F$ on the basis of the disturbance excitations, using which the hand actuator 9 is activated to generate a haptic roadway feedback R2 on the steering wheel 5 that correlates with the disturbance excitations.

The diagnostic module 25 determines whether there is a steering system fault in the steering system 1. For this purpose, the steering system operating voltage level $U_B$ is detected as a steering system parameter by means of a diagnostic sensor system (not shown) and transmitted to the diagnostic module 25. The diagnostic module 25 compares the steering system operating voltage level $U_B$ to a predefined steering system target operating voltage level $U_{SOLL}$ and generates a warning signal $S_W$ if there is a steering system fault, in which the steering system operating voltage level $U_B$ falls below the steering system target operating voltage level $U_{SOLL}$. The warning signal $S_W$ is output to the hand actuator 9, which, based on the warning signal $S_W$, generates the warning feedback R3 in the form of a steering wheel vibration on the steering wheel 5.

However, the steering feedback R1, the lane feedback R2, and the warning feedback R3 are partially superimposed, so that it can be assumed that the driver does not reliably perceive the warning feedback R3 in every driving state.

Figure 2:
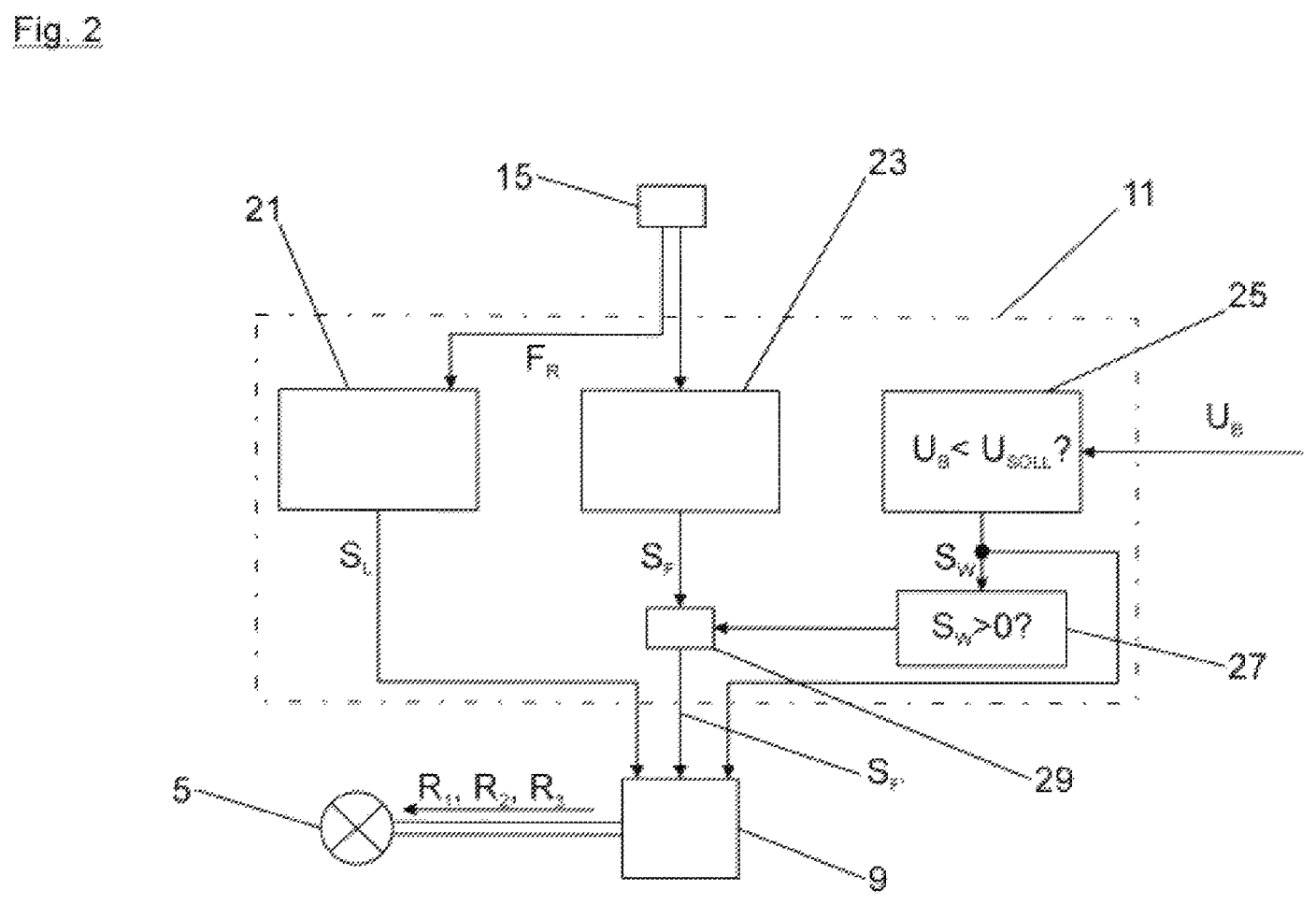

In a departure from the prior art and thus from the control unit 11 of FIG. 3, an evaluation unit 27 and a signal processing unit 29 are therefore additionally associated with the control unit 11 of FIG. 2, by means of which the roadway feedback R2 can be weakened or deactivated in the event of a steering system fault. By deactivating the roadway feedback R2 or by weakening the roadway feedback R2 in comparison to normal steering system operation without a steering system fault, there is no or only a slight overlap between the roadway feedback R2 and the warning feedback R3, so that the perceptibility of the warning feedback R3 is increased.

The evaluation unit 27 is in signal connection on the signal input side with the diagnostic module 25 and on the signal output side with the signal processing unit 29. The signal processing unit 29 is integrated into a signal path between the roadway converter module 23 and the hand actuator 9 and is interconnected between the roadway converter module 23 and the hand actuator. In the event of a steering system fault, i.e., when the warning signal $S_W$ is transmitted to the evaluation unit 27, the signal processing unit 29 is activated by the evaluation unit 27 in such a way that the signal transmission of the roadway signal $S_F$ is blocked in the signal processing unit 29 or instead a modified roadway signal $S_{F'}$ is generated, by means of which a weakened roadway feedback R2 is applied to the steering wheel 5. The weakened roadway feedback R2 has a reduced amplitude level and a reduced frequency in comparison to the roadway feedback R2 in normal steering system operation.

LIST OF REFERENCE SIGNS

1 steer-by-wire steering system
3 vehicle
5 steering wheel
7 steering sensor
9 hand actuator
11 control unit
13 steering gear actuator
15 steering gear sensor system
17 steering gear
19 front wheel
21 steering converter module
23 roadway converter module
25 diagnostic module
27 analysis unit
29 signal processing unit
$F_R$ restoring force
$S_F$ roadway signal
$S_{F'}$ modified roadway signal
$S_L$ steering counter torque signal
$S_W$ warning signal
R1 steering feedback
R2 roadway feedback
R3 warning feedback
$U_B$ steering system operating voltage level
$U_{SOLL}$ steering system target operating voltage level
$\alpha$ vehicle wheel steering angle

The invention claimed is:

1. A steer-by-wire steering system for a vehicle, comprising: a steering handle, having a steering gear actuator mechanically decoupled from the steering handle, a steering sensor which detects a rotational position and/or a rotational movement of the steering handle as a steering command, an electronic control unit which, as a function of the detected steering command, activates the steering gear actuator to set a vehicle wheel steering angle ($\alpha$), and a hand actuator activatable by the control unit, which generates haptic feedback (R1, R2, R3) for a driver on the steering handle, which is a haptic steering feedback (R1), in which a steering counter torque is applied to the steering handle, in a steering process, a roadway feedback (R2), which correlates with a roadway-side disturbance excitation acting on the vehicle, and a warning feedback (R3), which informs the driver of a fault in the steer-by-wire steering system, wherein the control unit is associated with an evaluation unit, by which the roadway feedback (R2) can at least be weakened or deactivated in the event of the steering system fault so that a perceptibility of the warning feedback (R3) is increased for the driver.

2. The steer-by-wire steering system according to claim 1, wherein a steering converter module is associated with the control unit which, during a steering process, generates a steering counter torque signal ($S_L$), by which the hand actuator is activatable to generate the steering feedback (R1) on the steering handle.

3. The steer-by-wire steering system according to claim 2, wherein a roadway converter module is associated with the control unit which generates a roadway signal ($S_F$) based on the roadway-side disturbance excitation, by which the hand actuator is activatable to generate the roadway feedback (R2) on the steering handle.

4. The steer-by-wire steering system according to claim 2, wherein a diagnostic module is associated with the control unit which, in the event of the steering system fault, generates a warning signal ($S_W$), by which the hand actuator is activatable to generate the warning feedback (R3) on the steering handle and/or by which an output unit is activatable to, in addition to the warning feedback (R3), generate an acoustic and/or visual warning message on the output unit.

5. The steer-by-wire steering system according claim 2, wherein the haptic feedback (R1, R2, R3) which can be provided on the steering handle (5) can be partially superimposed on one another.

6. The steer-by-wire steering system according to claim 2, wherein the haptic warning feedback (R3) is a steering handle vibration.

7. The steer-by-wire steering system according to claim 1, wherein a roadway converter module is associated with the control unit which generates a roadway signal ($S_F$) based on the roadway-side disturbance excitation, by which the hand actuator is activatable to generate the roadway feedback (R2) on the steering handle.

8. The steer-by-wire steering system according to claim 7, wherein a diagnostic module is associated with the control unit which, in the event of a steering system fault, generates a warning signal ($S_W$), by which the hand actuator is activatable to generate the warning feedback (R3) on the steering handle and/or by which an output unit is activatable to, in particular in addition to the warning feedback (R3), generate an acoustic and/or visual warning message on the output unit.

9. The steer-by-wire steering system according claim 7, wherein the haptic feedback (R1, R2, R3) which can be provided on the steering handle can be partially superimposed on one another.

10. The steer-by-wire steering system according to claim 7, wherein the haptic warning feedback (R3) is a steering handle vibration.

11. The steer-by-wire steering system according to claim 1, wherein a diagnostic module is associated with the control unit which, in the event of the steering system fault, generates a warning signal ($S_W$), by which the hand actuator is activatable to generate the warning feedback (R3) on the steering handle and/or by which an output unit is activatable to, in addition to the warning feedback (R3), generate an acoustic and/or visual warning message on the output unit.

12. The steer-by-wire steering system according to claim 11, wherein by the diagnostic module for recognizing the steering system fault, at least one steering system parameter, a steering system operating voltage level ($U_B$), is detectable and comparable to a predefined steering system target parameter, a steering system target operating voltage level ($U_{SOLL}$), and that the warning signal ($S_W$) can be generated by the diagnostic module in particular if the steering system target parameter is exceeded or not reached.

13. The steer-by-wire steering system according claim 12, wherein the haptic feedback (R1, R2, R3) which can be provided on the steering handle can be partially superimposed on one another.

14. The steer-by-wire steering system according claim 11, wherein the haptic feedback (R1, R2, R3) which can be provided on the steering handle can be partially superimposed on one another.

15. The steer-by-wire steering system according to claim 11, wherein the haptic warning feedback (R3) is a steering handle vibration.

16. The steer-by-wire steering system according claim 1, wherein the haptic feedback (R1, R2, R3) which can be provided on the steering handle can be partially superimposed on one another.

17. The steer-by-wire steering system according to claim 1, wherein the haptic warning feedback (R3) is a steering handle vibration.

18. The steer-by-wire steering system according to claim 1, wherein a signal processing unit activatable by the evaluation unit is interconnected in a signal path from the steering converter module to the hand actuator, and that in the event of the steering system fault, the signal processing unit is activatable by the evaluation unit so that signal transmission of a roadway signal ($S_F$) to the hand actuator is blocked or a modified roadway signal ($S_F'$) can be generated in the signal processing unit, by which a weakened roadway feedback (R2) is applicable to the steering handle.

19. The steer-by-wire steering system according to claim 18, wherein the weakened roadway feedback (R2) has a reduced amplitude and/or a reduced frequency in comparison to the roadway feedback (R2) in normal steering system operation.

20. A method for operating a steer-by-wire steering system according to claim 1.

* * * * *